US010220940B2

(12) United States Patent
Guery et al.

(10) Patent No.: US 10,220,940 B2
(45) Date of Patent: Mar. 5, 2019

(54) AIRCRAFT STEERING SYSTEM

(71) Applicants: AIRBUS OPERATIONS LIMITED, Bristol (GB); AIRBUS OPERATIONS SAS, Toulouse (FR)

(72) Inventors: Xavier Guery, Toulouse (FR); Matthieu Bradier, Toulouse (FR); James Morris, Bristol (GB)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 366 days.

(21) Appl. No.: 15/140,002

(22) Filed: Apr. 27, 2016

(65) Prior Publication Data
US 2016/0318604 A1 Nov. 3, 2016

(30) Foreign Application Priority Data

Apr. 28, 2015 (GB) .................. 1507222.6

(51) Int. Cl.
*B64C 25/36* (2006.01)
*B64C 25/40* (2006.01)
*B64C 25/50* (2006.01)
*B64C 25/34* (2006.01)

(52) U.S. Cl.
CPC ............ *B64C 25/405* (2013.01); *B64C 25/34* (2013.01); *B64C 25/36* (2013.01); *B64C 25/50* (2013.01); *Y02T 50/823* (2013.01)

(58) Field of Classification Search
CPC ....... B64C 25/405; B64C 25/34; B64C 25/36; B64C 25/50
See application file for complete search history.

(56) References Cited

U.S. PATENT DOCUMENTS

| 2006/0186267 | A1* | 8/2006 | Steiner | B60T 8/1703 244/110 A |
|---|---|---|---|---|
| 2008/0179146 | A1* | 7/2008 | Sullivan | B60L 7/26 188/164 |
| 2009/0261197 | A1 | 10/2009 | Cox et al. | |
| 2010/0006699 | A1 | 1/2010 | Sullivan | |
| 2013/0146707 | A1* | 6/2013 | Lynas | B64C 25/22 244/110 A |
| 2016/0221669 | A1* | 8/2016 | Didey | B64C 25/405 |

FOREIGN PATENT DOCUMENTS

| DE | 102011118117 A1 | 5/2012 |
|---|---|---|
| EP | 1867567 A1 | 12/2007 |
| EP | 2565119 A1 | 3/2013 |
| WO | 2014076485 A1 | 5/2014 |
| WO | 2014076486 A1 | 5/2014 |
| WO | WO2014076485 * | 5/2014 |
| WO | 2014184608 A2 | 11/2014 |

OTHER PUBLICATIONS

European Search Report dated Sep. 5, 2016 EP Application No. 16167214.

* cited by examiner

*Primary Examiner* — Justin M Benedik
(74) *Attorney, Agent, or Firm* — Nixon & Vanderhye P.C.

(57) ABSTRACT

The invention relates to an aircraft steering system using an aircraft ground taxi drive system whereby electrical power generated by a first motor-generator of a landing gear wheel drive system in a regenerative braking mode is supplied to a second motor-generator of a landing gear wheel drive system in a motorized driving mode.

23 Claims, 5 Drawing Sheets

AIRCRAFT STEERING SYSTEM

RELATED APPLICATIONS

The present application claims priority from Great Britain Application No. 1507222.6, filed Apr. 28, 2015, the disclosure of which is hereby incorporated by reference herein in its entirety.

FIELD OF THE INVENTION

The present invention relates to an aircraft steering system using an autonomous taxiing system.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Several autonomous ground taxi systems for driving the wheels while the aircraft is on the ground have been proposed in recent years. An example is disclosed in US2006/0065779, which proposes a powered nose aircraft wheel system. Prior art arrangements not restricted to nose landing gears are described in WO2011/023505 and WO2014/023939 which use an actuator to move a drive pinion in and out of driving engagement with a driven gear mounted to the wheel hub.

The autonomous ground taxi system derives its power from either a battery storage device or the auxiliary power unit (APU), which conventionally is a gas turbine generator but alternatively may be a fuel cell or similar electricity generator. When the aircraft is operating under the autonomous ground taxi system the main aircraft engines typically will be switched off. For aircraft with hydraulic steering and/or braking systems the hydraulic accumulator is typically driven by the main aircraft engines. When the main engines are switched off the steering/braking systems may require additional system redundancy to operate accommodating failure.

SUMMARY OF THE INVENTION

A first aspect of the invention provides an aircraft drive system, comprising: an electrical power source; a first landing gear having a first wheel for contacting the ground and a first motor-generator coupleable to the first wheel for applying a torque to the first wheel; a second landing gear having a second wheel for contacting the ground and a second motor-generator coupleable to the second wheel for applying a torque to the second wheel; and a controller for controlling the supply of electrical power between the electrical power source and the first motor-generator and the second motor-generator, wherein the controller is operable in a first mode of operation in which electrical power from the electrical power source is supplied to the first motor-generator and to the second-motor generator, and a second mode of operation in which electrical power generated by the first motor-generator in a regenerative braking mode is supplied to the second motor-generator in a motorized driving mode.

The term "wheel" of the aircraft landing gear is used here in its conventional sense to refer to a ground wheel which contacts the ground surface when the aircraft is supported by the ground and is not airborne. The term "coupleable" is used here in its conventional sense to indicate that the entities involved may be either permanently coupled or may be selectively coupled and decoupled during normal operations. The torque applied to the wheel may be in a forwards or reverse direction of rotation of the wheel, i.e. the torque may be applied to drive the wheel in either a forwards or reverse direction or rotation, or may be applied to resist the rotation of the wheel in either the forwards or reverse direction of rotation. Forwards and reverse here refers to the rolling direction of the wheel as the aircraft moves forward or in reverse. The term "motor-generator" is used here in its conventional sense to refer to a machine whereby electrical energy is converted into mechanical energy and vice versa. When operating as a motor the motor-generator may be used to apply a driving torque to rotate the wheel. When operating as a generator the motor-generator may be used to apply a braking torque to resist rotation of the wheel.

The aircraft drive system is advantageous in that the kinetic energy recovered by the first motor-generator in the regenerative braking mode is supplied to the second motor-generator in the motorized driving mode so that the first and second motor-generators can provide asymmetric torque and therefore generate an aircraft yaw moment upon pilot demand for steering the aircraft. Furthermore, the aircraft yaw moment can be generated whilst avoiding feeding regenerated electrical power towards the electrical power source. The aircraft driving system can therefore provide an emergency steering function without the significant additional weight and modifications required to incorporate an energy storage device or energy dissipation device to handle the regenerated electrical power.

The first motor-generator may be connected to the electrical power source by a first power supply. The second motor-generator may be connected to the electrical power source by a second power supply. The first power supply may include a first inverter. The second power supply may include a second inverter.

The first power supply and the second power supply may include a rectifier. The rectifier may be common between the first power supply and the second power supply.

The first power supply and the second power supply may include a transformer. The transformer may be common between the first power supply and the second power supply.

The common rectifier and transformer may form part of a transformer rectifier unit (TRU), or auto transformer rectifier unit (ATRU).

The controller may be coupled to the first power supply and to the second power supply and in the second mode of operation may be operable to provide a power transfer function between the first power supply and the second power supply.

The controller in the second mode of operation may be operable to control the electrical power supplied to the second motor-generator by supplementing the electrical power generated by the first motor-generator and supplied to the second motor-generator with electrical power from the electrical power source. This may be used to offset losses in the power generation by the first motor The controller in the second mode of operation may be operable to control the electrical power supplied to the second motor-generator to achieve equal and opposite torque application to the first and second wheels.

The power supplies may have insufficient energy storage capacity to store energy generated by the motor-generators.

The controller may include a switch for switching between the first mode of operation and the second mode of operation.

The switch may be automatically controlled or may be manually controlled.

The first mode of operation may correspond to a normal mode of operation for driving an aircraft on the ground, and the second mode of operation may correspond to an emergency mode of operation for steering an aircraft on the ground in the event of loss of a primary steering function for the aircraft.

The controller may include an input device configured to receive input of an aircraft yaw demand.

The electrical power source may be a generator.

The electrical power source may be connected to the first power supply and to the second power supply by an electrical network.

The controller may be configured to avoid the supply of electrical power generated by the first motor-generator in the regenerative braking mode onto the electrical network.

A further aspect of the invention provides an aircraft including the aircraft drive system according to the first aspect.

The aircraft may have a longitudinal centre line and the first landing gear may be disposed on one side of the centre line and the second landing gear may be disposed on the other side of the centre line.

A yet further aspect of the invention provides a method of controlling an aircraft, the aircraft having a drive system including an electrical power source, a first landing gear having a first wheel for contacting the ground and a first motor-generator coupleable to the first wheel for applying a torque to the first wheel, a second landing gear having a second wheel for contacting the ground and a second motor-generator coupleable to the second wheel for applying a torque to the second wheel, and a controller for controlling the supply of electrical power between the electrical power source and the first motor-generator and the second motor-generator, the method comprising: operating the controller in a first mode of operation to supply electrical power from the electrical power source to the first motor-generator and to the second-motor generator; and operating the controller in a second mode of operation to supply electrical power generated by the first motor-generator in a regenerative braking mode to the second motor-generator in a motorized driving mode.

Operating the controller in the second mode of operation may include controlling the electrical power supplied to the second motor-generator by supplementing the electrical power generated by the first motor-generator and supplied to the second motor-generator with electrical power from the electrical power source.

Operating the controller in the second mode of operation may include controlling the electrical power supplied to the second motor-generator to achieve equal and opposite torque application to the first and second wheels.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
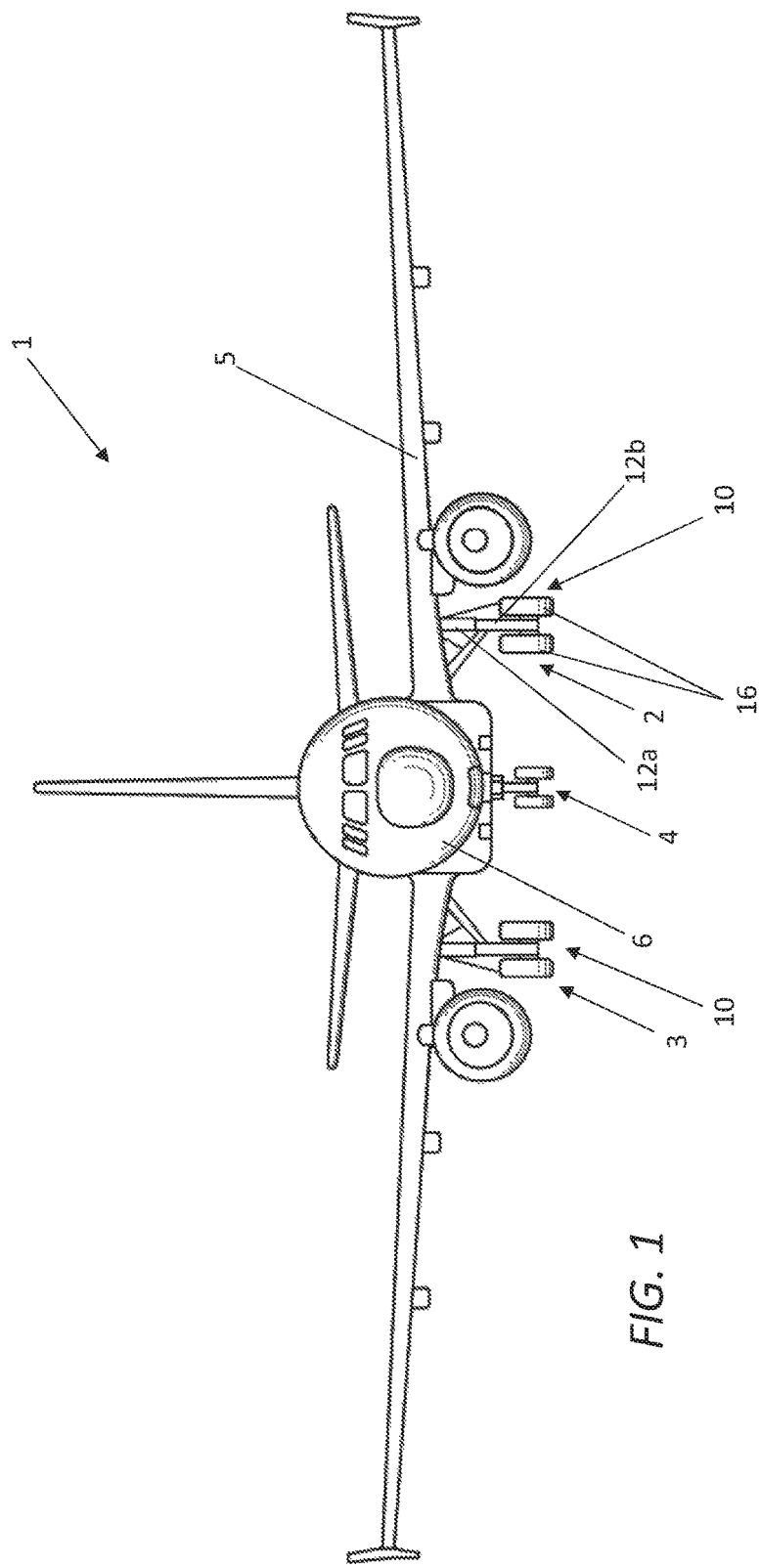
FIG. 1 shows a front view of an aircraft having the drive system.

An embodiment of the invention is shown in FIGS. 1 to 7. As shown in FIG. 1 the aircraft 1 has left and right main landing gear 2, 3 and a nose landing gear 4 (a tricycle configuration). The landing gear each have two wheels (a diablo configuration). The principles of the embodiment may be applied to aircraft with any arrangement of landing gear, and landing gear with any number of wheels, e.g. a single wheel, or four or more wheels.

Wheel Actuator

The landing gear drive system is arranged for driving the main landing gear (i.e. a landing gear attached to wing structure or fuselage structure in the region of the wings), since the weight supported by the main landing gear is considered to provide the best traction between the wheels and the ground to enable reliable aircraft ground taxiing. The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc. In the subsequent figures the landing gear having the drive system is indicated generally as item 10.

Figure 2:
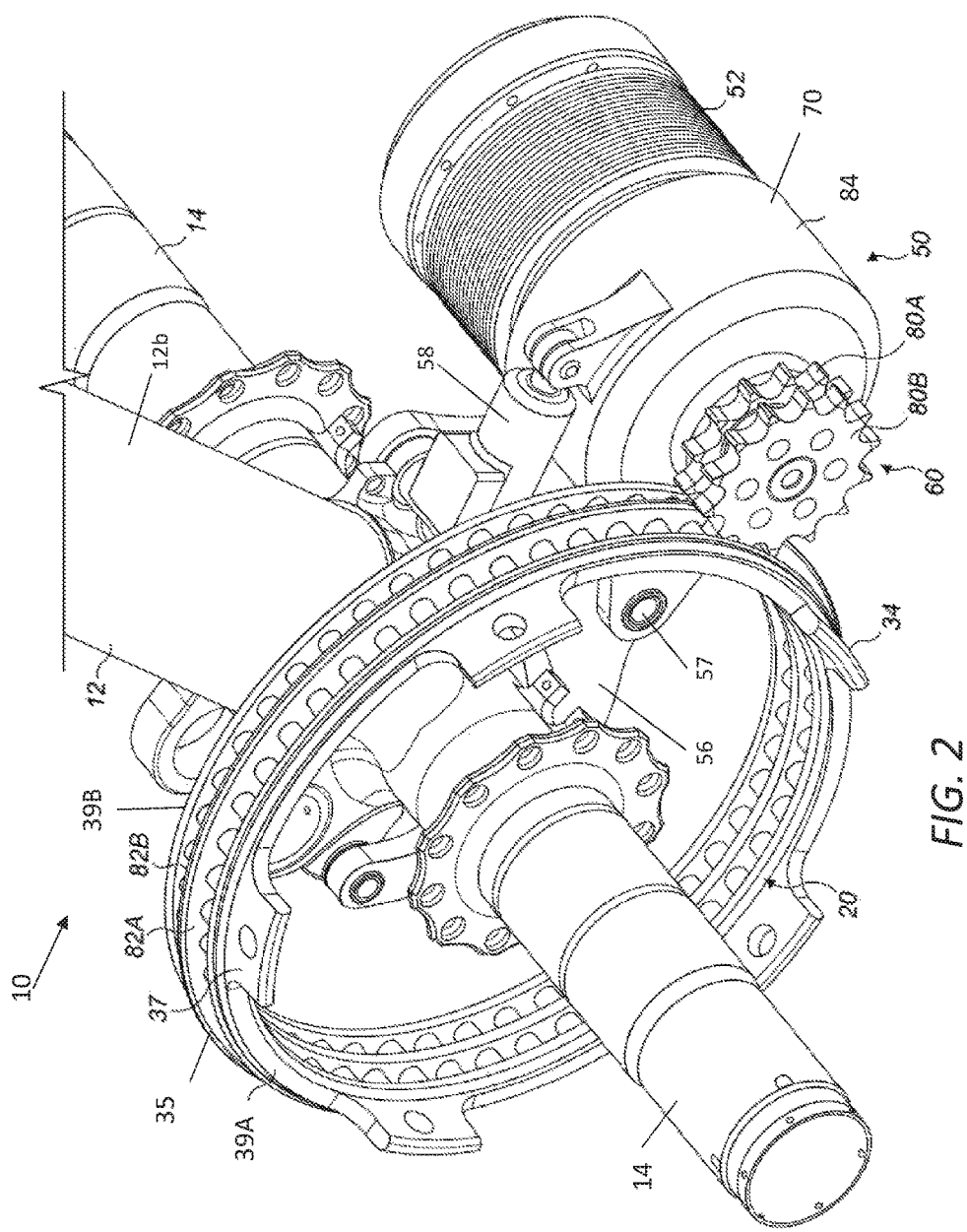
FIG. 2 shows an isometric view of a wheel actuator of the drive system according to one embodiment.

The landing gear 10 shown in FIG. 2 includes a telescopic shock-absorbing main leg 12, including an upper telescopic part 12a (main fitting) and a lower telescopic part 12b (slider). The upper telescopic part 12a is attached to the aircraft wing 5 by its upper end. In other embodiments the upper telescopic part may be attached to the aircraft fuselage 6 or to the wing and fuselage. The lower telescopic part 12b supports an axle 14 carrying a pair of wheels 16 (removed in FIG. 2 for clarity), one on either side of the main leg. The wheels 16 are arranged to rotate about the axle 14 to enable ground movement of the aircraft, such as taxiing or landing.

Each wheel 16 comprises a tyre supported by a hub (not shown). Each wheel hub has a rim for holding the tyre. A landing gear wheel drive system 50 includes a driven gear 20 attached to the hub so as to be rotatable with the wheel 16. In the illustrated embodiment the driven gear 20 comprises a roller gear 34 by a rigid annular ring 35 and a series of pins (not shown) projecting from both sides of the annular ring 35. A first series of rollers 82A rotatably supported by the pins is provided on one side of the annular ring 35, and a second series of rollers 82B rotatably supported by the pins is provided on the other side of the annular ring. Each series of rollers 82A, 82B extend around the annular ring to form a continuous track. First and second lateral annular rings 39A. 39B sandwich the first and second series of rollers 82A, 82B. The pins supporting the first series of rollers 82A extend between the annular ring 35 and the first lateral annular ring 39A, and the pins supporting the second series of rollers 82B extend between the annular ring 35 and the second lateral annular ring 39B. The annular ring 35 therefore forms a central spine for supporting the pins which are cantilevered off the central spine.

The first lateral annular ring 39A comprises a plurality of connection extension tabs 37 which provide a rigid connection to the hub (not shown). Alternatively, a flange forming a continuous extension rim, with or without cut outs, projecting axially from the inner diameter of the annular ring 39A may be used to provide the rigid connection to the hub. The driven gear-to-hub interface may be a rigid attachment or alternatively may include a flexible interface, e.g. a rubber bushing, to permit some angular deflection of the driven gear with respect to the wheel hub to accommodate deflections of the landing gear structure and to isolate the driven gear from wheel deformation loads.

The drive system 50 further comprises a motor-generator 52 which is configured in a motorized driving mode to rotate a drive pinion 60 via a gearbox 70. In the illustrated embodiment the drive pinion 60 is a wheel-type sprocket comprising multiple co-axial sprockets 80A, 80B each with radially-extending teeth. The respective co-axial sprockets 80A, 80B of the drive pinion 60 are able to mesh with the co-axial rings of rollers 82A, 82B of the driven gear 20. The groove between the sprockets 80A, 80B may be in rolling contact with the outer diameter of the central spine (annular ring 35) of the roller gear 34. The rolling contact is preferably at the pitch radius of the rollers.

In the illustrated embodiment, the drive system 50 drives only one of the wheels 16 on each landing gear 10. However, it is intended that one drive system 50 may alternatively be provided for each wheel 16. For a landing gear with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft 54 of each drive system via a differential to permit the driven wheels to rotate at different speeds when the aircraft executes a turn whilst on the ground.

In the illustrated embodiment the gearbox 70 is an epicyclic reduction gearbox which provides a drive path between the motor 52 and the drive pinion 60. The motor is an electric motor which drives an input shaft of the drive path. An output shaft (or drive shaft) of the drive path is coaxial with the input shaft and is also coaxial with the axis of rotation of the motor. The drive pinion 60 is mounted on the output shaft.

The drive system 50 is supported by a bracket 56, which is rigidly connected to the base of slider 12b and pivotally connected to the motor 52 about a pivot axis 57. The mounting bracket 56 extends beneath the axle 14 and is attached by mounting pins to aft and fore mounting points respectively on the slider. The mounting pins permit ready detachment of the bracket from the landing gear. The drive system 50 may alternatively be mounted on the upper telescopic part 12a (main fitting) or on the axle 14.

The gearbox 70 has a housing (or casing) 84 to which the motor 52 is fixed on one side and from which the output shaft having the drive pinion 60 projects on the opposite side. The housing 84 has a projecting lug which is pivotally connected at 57 to the mounting bracket 56. The motor 52 and gearbox 70 are encased within a housing to protect the components therein from environmental contamination by debris etc which may cause malfunction.

A linear positioning actuator 58 extends between the bracket 56 (at an end nearest the axle 14) and the motor 52. Linear movement of the actuator 58 is translated to rotational movement of the drive pinion 60 about the pivot 57, more specifically movement of the rotational axis of the drive pinion about the pivot 57. The drive pinion 60 can thus be rotated between a first configuration in which the drive pinion (sprocket) 60 engages the driven gear (roller gear 34) and a second configuration in which the drive pinion 60 does not engage the driven gear.

The positioning actuator 58 may be an hydraulic actuator, an electro-mechanical actuator (EMA), or an electro-hydraulic actuator (EHA), for example.

The drive system 50 is biased to the second (disengaged) configuration, firstly by gravity (when the aircraft is not inverted) and secondly by a biasing element.

During engagement, the inertia (speed) of drive pinion 60 and driven gear 20 would be matched using available motor speed feedback (for sprocket speed) and either the aircraft tachometer (not shown) or an independent roller-gear speed sensor, such as an inductive sensor using the rollers as target, may be used.

Whilst in the drive system illustrated the drive pinion 60 is arranged as a sprocket have two coaxial rows of sprocket teeth and the driven gear 20 is arranged as a roller gear having two coaxial rows of rollers, and the gearbox 70 is an epicyclic gearbox, it will be appreciated that other drive systems may be embodied differently. For example, the sprocket (drive pinion) 60 may be replaced by a roller gear drive pinion having two co-axial rings of rollers and the roller gear 34 (driven gear) is replaced by a sprocket having two coaxial rings of sprocket teeth. The roller gear in either embodiment may alternatively be formed as a roller chain or roller gear having a single ring of rollers for engaging with a driven gear formed as a sprocket (not shown) having a single row of sprocket teeth. The drive pinion and drive gear may further alternatively be formed as spur gears or other type of toothed gear moveable into and out of meshing engagement by the positioning actuator 58. The epicyclic gearbox 70 may be replaced by a parallel axis gearbox.

Whilst in the illustrated embodiments the driven gear and the drive pinion have multiple coaxial rows of rollers/sprockets, it will be appreciated that either one or three or more co-axial rows of rollers/sprockets may alternatively be provided. Increasing the number of rows of rollers/sprockets decreases the load on each roller/sprocket row.

The positioning actuator may be arranged as a self-locking positioning actuator which self-locks in the extended position corresponding to the disengaged second configuration of the drive system 50. The self-locking actuator may be configured to unlock as the actuator is commanded to retract. The provision of a self-locking actuator ensures the motor/gearbox of the drive system 50 remains positively locked in the second (disengaged) configuration. An alternative to the self-locking positioning actuator is to provide the (non-self-locking) positioning actuator 58 with an external locking mechanism, such as a self-latching hook and pin locking mechanism.

In the illustrated embodiments where the landing gear 10 has two wheels, only one of which is driven, the driven wheels of the aircraft will likely be the outer wheels of the two landing gears with respect to the aircraft centreline. Alternatively, the inner wheels may be driven. It is unlikely that one inner and one outer wheel would be driven, although this is of course a possibility.

As mentioned above, the motor-generator 52 of the wheel actuator is operable not only in a motorized driving mode for applying a torque to the wheel but also in a regenerative braking mode.

Electrical Architecture

Figure 3:
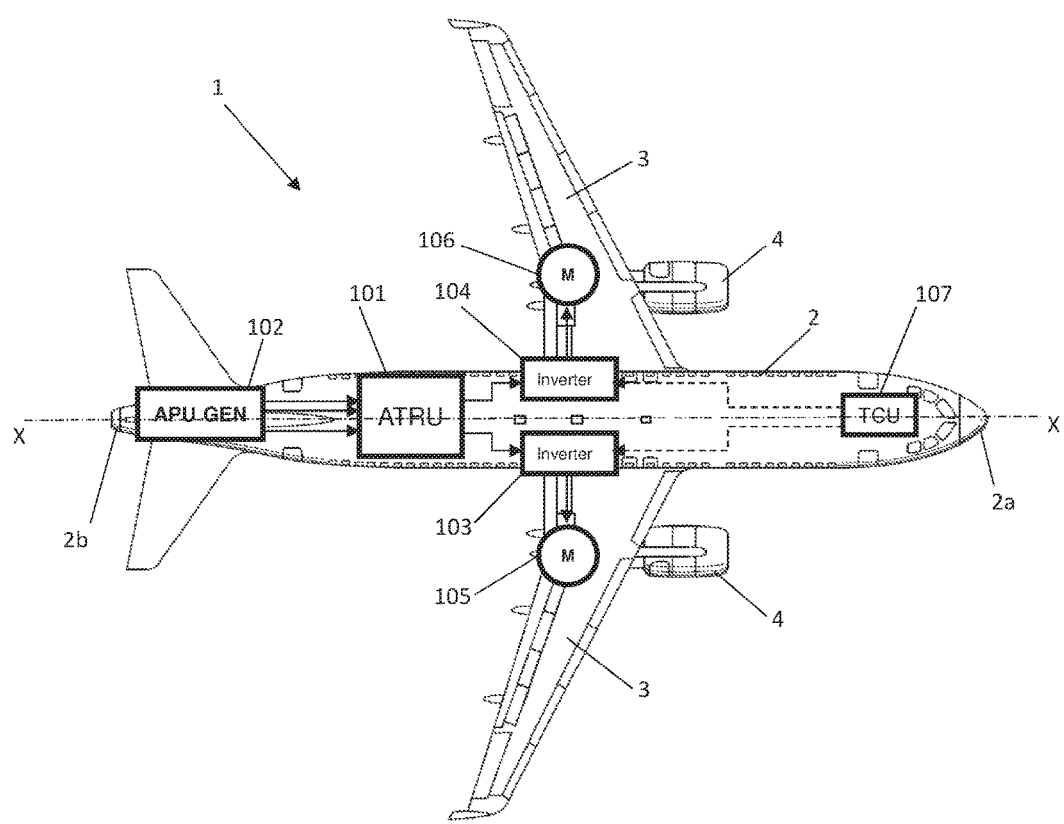
FIG. 3 shows schematically an electrical architecture and control system for the drive system.

The electric system for the landing gear drive system 10 is shown in FIG. 3. The electric system includes an auto transformer & rectifier unit (ATRU) 101 which takes power from an auxiliary power unit (APU) generator 102 and feeds electrical power to two inverters—right side inverter 103 and left side inverter 104. The inverters 103,104 control the motor-generator 52 of right wheel actuator (M) 105 and left wheel actuator (M) 106, respectively. Torque commands are sent to the inverters 103, 104 by the taxi control unit (TCU) 107.

Aircraft APUs commonly operate at 115VAC, whilst many aircraft systems run at different voltages. In the arrangement depicted in FIG. 3 the APU 102 operates at 115VAC, which the motor-generators 52 of the right and left wheel actuators 105, 106 operate at 270VAC, so a transformer is required to step up the voltage. The (auto-) transformer part of ATRU 101 performs this function.

Many of the aircraft's systems operate at 270VDC so a rectifier is required to convert the AC power output of the APU. The rectifier part of ATRU 101 performs this function. Since the motor-generators 52 operate at 270VAC inverters 103,104 are required to convert the DC power output of the ATRU 101 to AC.

It will be appreciated that the electrical architecture is dependent upon the type of generator used to generate the electrical power for the motor-generators 52. For instance if a fuel cell were to be used in place of the APU 102 there may be no requirement for a rectifier (unless otherwise required). Also, if the voltage of the generator and the motor-generators 52 were matched then there may be no requirement for a transformer (unless otherwise required). Generically then the motor-generators 52 of the wheel actuators 105, 106 require an electrical power source for operation as a motor in a driving mode to generate a driving torque for the landing gear wheel(s).

Figure 4:
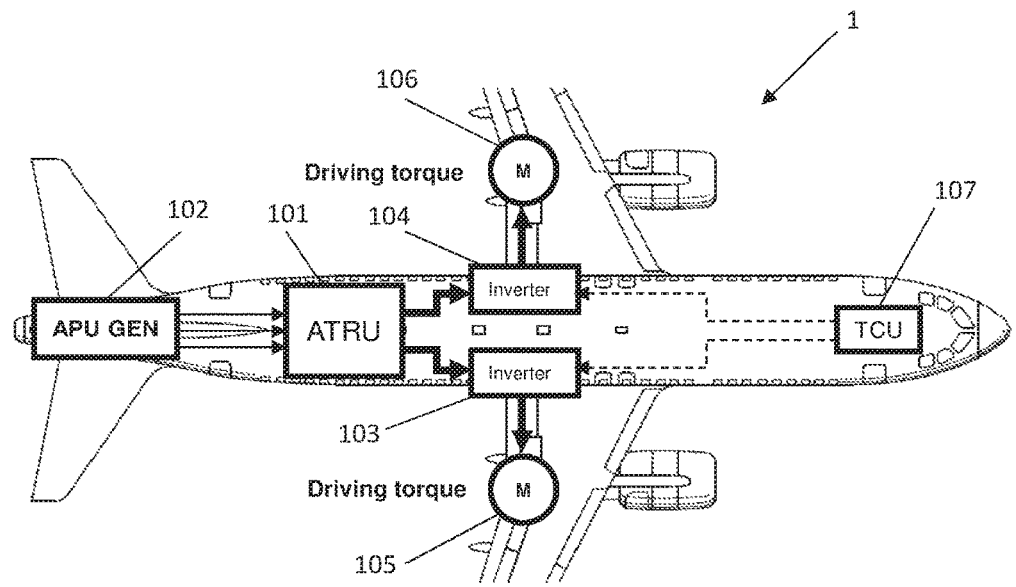
FIG. 4 shows schematically the electrical power flow of the drive system according to a normal mode of operation.

FIG. 4 illustrates the aircraft 1 operating in the driving mode, with wheel actuators 105, 106 both developing driving toque to move the aircraft forward on the ground. In the arrangement shown in FIG. 4 the main engines 4 are turned off. The motor-generators 52 of the wheel actuators, M, are operating as motors taking electrical power from the APU 102 and the ATRU 101. The arrows between the APU 102, ATRU 101, M 105 and M 106 show the direction of electrical power flow. The driving torque commands are sent by the TCU 107 to the inverters 103, 104 associated with the respective wheel actuators, M 105 and M 106.

As mentioned above, the motor-generators of the wheel motors, M, are each also operable in a braking torque mode to convert kinetic energy of their respective rotating landing gear wheel(s) to electrical energy. In doing so, the wheel actuators M 105 and M 106 apply a braking toque to their respective landing gear wheel(s).

The aircraft 1 has no means at the ATRU level for storing or dissipating electrical power re-generated by the wheel actuators M 105, 106. Means for storing the electrical power re-generated may include batteries or capacitors, or an electrically driven hydraulic accumulator, for example. Means for dissipating the electrical power re-generated may include a heat sink, for example. However, such systems would tend to be relatively heavy for handling the large electrical power re-generated by the wheel actuators M 105, 106 in a braking mode, and so the electrical architecture shown in the illustrated embodiment has no such means at the ATRU level for storing or dissipating electrical power re-generated by the wheel actuators M 105, 106.

It is therefore not possible to operate the aircraft 1 in a symmetric braking mode using the wheel actuators, with both wheel actuators M 105, 106 operating in a braking torque mode simultaneously. Deceleration of the aircraft on the ground is controlled by the aircraft's braking system using conventional wheel brakes which will not be further described herein.

Figure 5:
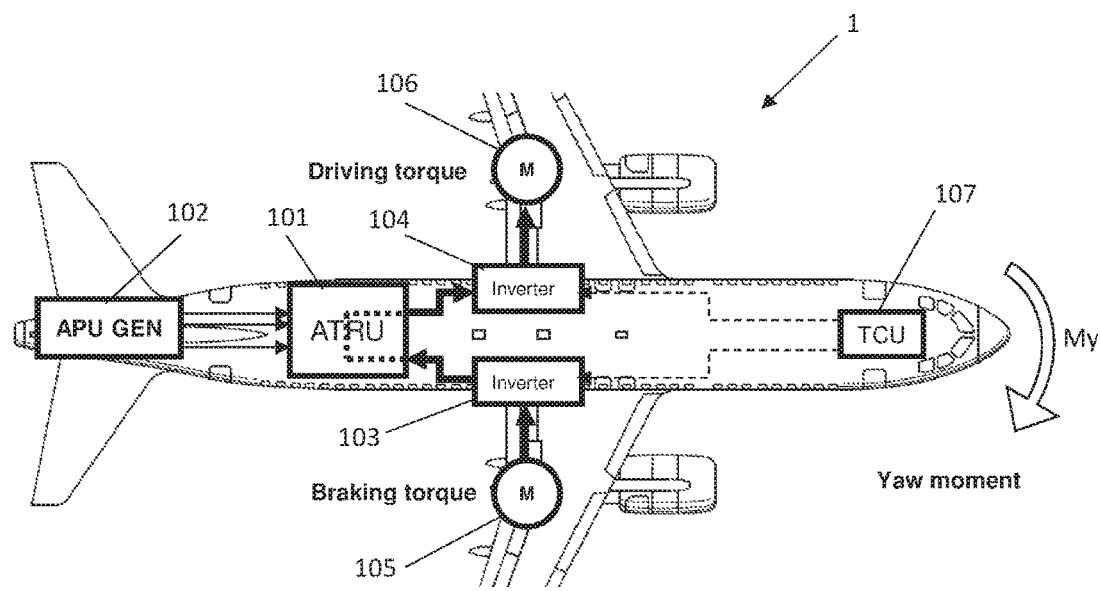
FIG. 5 shows schematically the electrical power flow of the drive system according to an emergency steering mode of operation.

FIG. 5 illustrates the aircraft 1 operating in an emergency steering mode to develop a yaw moment, My, about the aircraft's centre of gravity whilst on the ground. In the event of partial or complete loss of nose wheel steering of the aircraft for any reason whilst the aircraft is moving forward, the emergency steering mode may be used to steer the aircraft 1 as the aircraft is brought safely to a stop. Generally this emergency steering mode would be used at ground taxi speeds (typically 20 knots and under) but could be configured for use at higher speeds.

In the emergency steering mode one of the wheel actuators, in this case the right wheel actuator 105, is operated in its braking mode and the other of the wheel actuators, in this case the left wheel actuator 106, is operated in its driving mode. This creates a differential force acting on the left and right main landing gears 2, 3. The right main landing gear 3 applies a negative force in the aircraft longitudinal direction and the left main landing gear 2 applies a positive force in the aircraft longitudinal direction. Due to the offset of the main landing gear from the aircraft longitudinal centreline these forces create the clockwise yaw moment, My, about the aircraft centre of gravity illustrated in FIG. 5.

Electrical power generated by the motor-generator 52 of the right wheel actuator 105 in a regenerative braking mode is supplied to the motor-generator 52 of the left wheel actuator 106 in a motorized driving mode. In the illustrated embodiment this is achieved by a power transfer function between the right inverter 103 (associated with the right wheel actuator 105) and the left inverter 104 (associated with the left wheel actuator 106). The power transfer function is this embodiment is through the ATRU 101 and avoids feeding any regenerated electrical power onto the electrical power network back towards the APU 102. As stated above the electrical architecture at the ATRU level has no capacity to store or dissipate any regenerated electrical power.

The arrows between the right wheel actuator 105, the right inverter 103, the ATRU 101, the left inverter 104 and the left wheel actuator 106 show the direction of electrical power flow. In addition, the arrows between the APU 102 and the ATRU 101 show the direction of electrical power flow only towards the ATRU 101.

It will be apparent that the emergency steering mode also comprises analogously applying a braking torque to the left wheel actuator 106 and a driving torque to the right wheel actuator 105 to generate an aircraft yaw moment acting in the opposite (anticlockwise) direction for steering the aircraft to the left, thus providing left and right steering capability in the emergency steering mode.

Pilot Control

Figure 6:
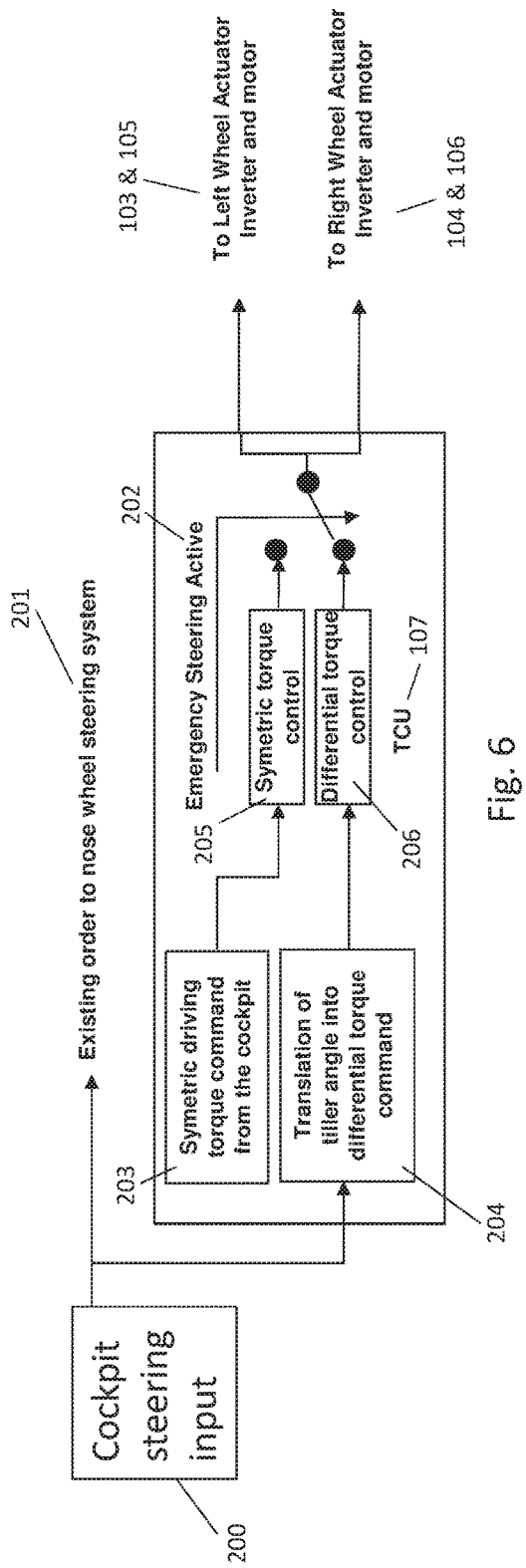
FIG. 6 shows schematically the control system of the drive system.

FIG. 6 illustrates schematically a block diagram of the pilot control in the emergency steering mode of the illustrated embodiment. In the cockpit of the aircraft 1 the pilot has control of a steering input device 200, such as a steering tiller.

In the normal mode of steering operation the steering input device 200 is used to command 201 a conventional aircraft steering system such as a nose wheel steering system. In this normal mode of operation an emergency steering mode switch 202 is in an inactive state, and the TCU 107 is operable to provide symmetric driving torque control 205 of the right and left wheel actuators 105, 106 based upon a pilot input taxi speed command 203 from a taxi speed input device (not shown). In the normal mode of operation, the symmetric driving torque control 205 outputs symmetrical driving torque commands to the right inverter 103 & wheel actuator 105 and the left inverter 104 & wheel actuator 106.

In the emergency mode of steering operation, which may be activated through partial or total loss of the nose wheel steering system whilst the aircraft is on the ground, the TCU 107 is operable to provide asymmetric or differential torque control 206 of the right and left wheel actuators 105, 106. In this emergency steering mode of operation an emergency steering mode switch 202 is in an active state, and the TCU translates the steering angle of the steering input device 200 into a differential torque command 204. This differential torque command 204 generates a differential torque control 206 which outputs driving torque and braking torque commands to the right inverter 103 & wheel actuator 105 and the left inverter 104 & wheel actuator 106, or vice versa, depending on the sense of the steering yaw moment.

Power Electronics

Figure 7:
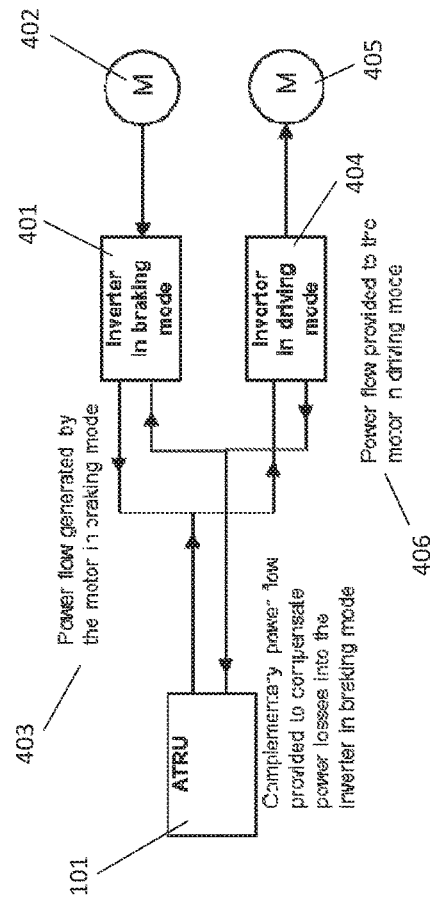
FIG. 7 illustrates schematically the electrical power flow of the drive system.

Due to losses in the power transfer in the emergency steering mode, particularly due to the inefficiency of the inverter, it may be desirable that the wheel actuator generating the driving torque draws additional power through the ATRU 101, as shown in FIG. 7. The inverter 401 associated with the wheel actuator 402 providing the braking torque will be generating electrical power 403 at its inputs. This generated electrical power directly feeds 406 into the inverter 404 associated with the wheel actuator 405 providing the driving torque. The power 403 generated by the inverter 401 in the braking mode is lower than the power produced by the motor-generator of the braking wheel actuator 402. In order to provide the same power on the driving wheel actuator 405, the ATRU 101 needs to provide the power corresponding to the power lost in the inverter 401.

Of course, it may not be necessary or desirable to provide equal and opposite driving/braking forces for the left and right wheel actuators and so the additional power draw from the ATRU 101 in the emergency steering mode may not be required.

Additionally, it will be appreciated that in the normal mode of operation asymmetric driving of the left and right wheel actuators may be desirable as well as symmetric driving of the left and right wheel actuators as described above. The control electronics of the TCU 107 could be updated accordingly to reflect this need.

The emergency steering mode switch 202 may be activated automatically upon loss of steering from the normal mode of operation, or this may activated manually, e.g. by the pilot.

All of the cockpit pilot input devices described above may be supplemented or replaced by remotely controlled input devices for autonomous operations, e.g. where the aircraft is a remotely operated unmanned aerial vehicle (UAV).

Although the invention has been described above with reference to one or more preferred embodiments, it will be appreciated that various changes or modifications may be made without departing from the scope of the invention as defined in the appended claims.

The invention claimed is:

1. An aircraft drive system, comprising:
an electrical power source;
a first landing gear having a first wheel for contacting the ground and a first motor-generator coupleable to the first wheel for applying a torque to the first wheel;
a second landing gear having a second wheel for contacting the ground and a second motor-generator coupleable to the second wheel for applying a torque to the second wheel; and
a controller for controlling the supply of electrical power between the electrical power source and the first motor-generator and the second motor-generator, wherein the controller is operable in a first mode of operation in which electrical power from the electrical power source is supplied to the first motor-generator and to the second-motor generator, and a second mode of operation in which electrical power generated by the first motor-generator in a regenerative braking mode is supplied to the second motor-generator in a motorized driving mode, wherein in the second mode the controller is configured to avoid feeding any regenerated electrical power onto an electrical power network back towards the electrical power source.

2. An aircraft drive system according to claim 1, wherein the first motor-generator is connected to the electrical power source by a first power supply, and wherein the second motor-generator is connected to the electrical power source by a second power supply.

3. An aircraft drive system according to claim 2, wherein the first power supply includes a first inverter, and wherein the second power supply includes a second inverter.

4. An aircraft drive system according to claim 2, wherein the first power supply and the second power supply include a rectifier.

5. An aircraft drive system according to claim 4, wherein the rectifier is common between the first power supply and the second power supply.

6. An aircraft drive system according to claim 5, wherein the rectifier and transformer form part of a transformer rectifier unit (TRU).

7. An aircraft drive system according to claim 4, wherein the transformer is common between the first power supply and the second power supply.

8. An aircraft drive system according to claim 2, wherein the first power supply and the second power supply include a transformer.

9. An aircraft drive system according to claim 2, wherein the controller is coupled to the first power supply and to the second power supply and in the second mode of operation is operable to provide a power transfer function between the first power supply and the second power supply.

10. An aircraft drive system according to claim 9, wherein the controller in the second mode of operation is operable to control the electrical power supplied to the second motor-generator by supplementing the electrical power generated by the first motor-generator and supplied to the second motor-generator with electrical power from the electrical power source.

11. An aircraft drive system according to claim 10, wherein the controller in the second mode of operation is operable to control the electrical power supplied to the second motor-generator to achieve equal and opposite torque application to the first and second wheels.

12. An aircraft drive system according to claim 2, wherein the power supplies have insufficient energy storage capacity to store energy generated by the motor-generators.

13. An aircraft drive system according to claim 2, wherein the electrical power source is connected to the first power supply and to the second power supply by an electrical network.

14. An aircraft drive system according to claim 1, wherein the controller includes a switch for switching between the first mode of operation and the second mode of operation.

15. An aircraft drive system according to claim 14, wherein the switch is automatically controlled or is manually controlled.

16. An aircraft drive system according to claim 14, wherein the first mode of operation corresponds to a normal mode of operation for driving an aircraft on the ground, and wherein the second mode of operation corresponds to an emergency mode of operation for steering an aircraft on the ground in the event of loss of a primary steering function for the aircraft.

17. An aircraft drive system according to claim 1, wherein the controller includes an input device configured to receive input of an aircraft yaw demand.

18. An aircraft drive system according to claim 1, wherein the electrical power source is a generator.

19. An aircraft including the aircraft drive system according to claim 1.

20. An aircraft according to claim 19, wherein the aircraft has a longitudinal centre line and the first landing gear is disposed on one side of the centre line and the second landing gear is disposed on the other side of the centre line.

21. A method of controlling an aircraft, the aircraft having a drive system including an electrical power source, a first landing gear having a first wheel for contacting the ground and a first motor-generator coupleable to the first wheel for applying a torque to the first wheel, a second landing gear having a second wheel for contacting the ground and a second motor-generator coupleable to the second wheel for applying a torque to the second wheel, and a controller for controlling the supply of electrical power between the electrical power source and the first motor-generator and the second motor-generator, the method comprising: operating the controller in a first mode of operation to supply electrical power from the electrical power source to the first motor-generator and to the second-motor generator; and operating the controller in a second mode of operation to supply electrical power generated by the first motor-generator in a regenerative braking mode to the second motor-generator in a motorized driving mode, wherein in the second mode the controller is configured to avoid feeding any regenerated electrical power onto an electrical power network back towards the electrical power source.

22. A method according to claim 21, wherein operating the controller in the second mode of operation includes controlling the electrical power supplied to the second motor-generator by supplementing the electrical power generated by the first motor-generator and supplied to the second motor-generator with electrical power from the electrical power source.

23. A method according to claim 22, wherein operating the controller in the second mode of operation includes controlling the electrical power supplied to the second motor-generator to achieve equal and opposite torque application to the first and second wheels.

* * * * *